(12) United States Patent
Sakamoto et al.

(10) Patent No.: US 6,462,492 B1
(45) Date of Patent: Oct. 8, 2002

(54) POSITION-SENSORLESS CONTROLLING METHOD OF SYNCHRONOUS MOTOR

(75) Inventors: Kiyoshi Sakamoto, Hitachi; Tsunehiro Endou, Hitachiota; Naohiko Takahashi; Haruo Miura, both of Chiyoda, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/655,490

(22) Filed: Sep. 5, 2000

(30) Foreign Application Priority Data

Nov. 30, 1999 (JP) ............................................. 11-339286

(51) Int. Cl.$^7$ ................................................. H02P 6/08
(52) U.S. Cl. ........................ 318/254; 318/721; 318/723
(58) Field of Search ................................. 318/138, 254, 318/439, 700, 720, 721, 722, 724, 723

(56) References Cited

U.S. PATENT DOCUMENTS 5,739,650 A * 4/1998 Kimura et al. .............. 318/254

6,208,109 B1 * 3/2001 Yamai et al. ................ 318/716

FOREIGN PATENT DOCUMENTS

| JP | A-8-308286 | 11/1996 |
|----|------------|---------|
| JP | A-9-191698 | 7/1997  |

* cited by examiner

*Primary Examiner*—Bentsu Ro
(74) *Attorney, Agent, or Firm*—Antonelli, Terry, Stout & Kraus, LLP

(57) ABSTRACT

There is provided a control method capable of stably rotating a synchronous motor synchronously with an output frequency even when a phase error between a real rotary axis and a control rotary axis is large. In a phase error operating unit, from the magnitude of the motor current, the magnitude of the motor voltage, the phase difference between the motor current and the motor voltage, and the motor constants, the phase difference between the motor current and the real rotary axis is determined as the first phase difference, and the phase difference between the motor current and the virtual rotary axis is determined as the second phase difference. The difference between the first and second phase differences is defined as the phase error, and the estimation position is so modified as to make the phase error zero.

13 Claims, 11 Drawing Sheets

$$\omega_r^* \cdot dL = \frac{I_q^* \cdot VId + I_d^* (VI_q + k_{Ec}\omega_r^*)}{(I_q^*)^2 + (I_d^*)^2}$$

$$\pm \frac{\sqrt{-\{I_d^* VId - I_q^*(VI_q + k_{Ec}\omega_r)\}^2 + ((I_q^*)^2 + (I_d^*)^2) \cdot (k_{Ec}\omega_r^*)^2}}{(I_q^*)^2 + (I_d^*)^2}$$

Inputs: VIq, VId, Iq*, Id*, ωr*
Output: ωr* · dL
Block: 68L

PARAMETER V1 ESTIMATING UNIT
BASED ON IdACR AND IqACR

V1\* Vq\*\* Vd\*\* VIq VId ωr\*

$$dv = \frac{v_d^{} VId + V_q^{}(VI_q + k_{Ec}\omega_r^*)}{V_1^*}$$

$$\mp \frac{\sqrt{\{v_d^{**}(VI_q + k_{Ec}\omega_r^*) - V_q^{**} VId\}^2 + (v_1^*)^2 \cdot (k_{Ec}\omega_r^*)^2}}{v_1^*}$$

68V dV

OPERATIONAL EXPLANATION
OF PHASE ADJUSTER

POSITION-SENSORLESS CONTROLLING METHOD OF SYNCHRONOUS MOTOR

BACKGROUND OF THE INVENTION

The present invention relates to a method of controlling synchronous motors and more particularly, to a position-sensorless controlling method of synchronous motor, that is, a controlling method of synchronous motor without resort to position sensor.

The structure of a rotor of a synchronous motor is classified into a salient type structure in which the winding inductance changes with the rotation position, and a non-salient type structure in which the winding inductance is substantially constant. A permanent magnet constituting the rotor is embedded in a core in the former structure, and it is arranged on the surface of the rotor in the latter structure.

There are two kinds of methods for driving the synchronous motor. Namely, (1) A so-called synchronous operation method in which the rotation position is not detected, and the synchronous motor is driven in open loop like the inverter control for induction motors.

(2) A so-called brushless DC motor operation method in which any rotary position detecting means is used to operate the synchronous motor in closed loop.

Of these methods, in the synchronous operation method, it is required that an optimum motor voltage conforming to a load be applied in accordance with an inverter frequency. Accordingly, unless any optimum voltage control is carried out, not only an increase in motor current will be caused but also a shortage of torque will occur during an abrupt load change operation or an abrupt accelerating/decelerating operation, thus causing the motor to stop.

On the other hand, in the brushless DC motor operation, any rotor position sensor is provided and as compared to the inverter drive for induction motors, the number of wiring lines between an inverter and the motor increases to degrade the maintainability and reliability, thereby preventing a widespread use of this method for general industries and its use in special ambience such as a compressor. To eliminate the above disadvantages, various kinds of position-sensorless techniques for detecting the position without using a rotor position sensor have been announced.

To sum up the position-sensorless techniques, there are available a position-sensorless technique adapted for stop/low-speed region and a position-sensorless technique adapted for medium/high-speed region. The stop/low-speed position detection is applied to the salient motor and takes the advantage of the fact that the winding inductance differs with rotation positions to measure the position through such an expedient as injection of a high-frequency signal.

In the medium/high-speed region, a voltage induced in the motor winding is utilized and various kinds of utilization methods have been announced.

For example, one may refer to a technique disclosed in JP-A-8-308286. In this technique, in relation to a d-q real (actual) rotary coordinate system having d-axis representing positions in the flux direction of the permanent magnet rotor and q-axis representing positions 90° leading the d-axis in the rotation direction, a dc-qc control rotary coordinate system having dc axis representing virtual rotary positions from the control viewpoint, and qc-axis representing virtual positions 90° leading the dc-axis in the rotation direction is defined. On the d-q real rotary coordinates, a motor model is expressed in accordance with an equation indicative of the relation between current and voltage by using motor parameters such as motor resistance, motor inductance and motor generation constant, and it is demonstrated that a difference between d-axis current predicted from the motor model and dc-axis current on the control axis is proportional to position error $\Delta\theta$.

In predictive calculation of the d-axis current, on the assumption that the motor parameters are the same for the motor model and the real motor and $\Delta\theta$ is close to zero, approximation of $\sin \Delta\theta = \Delta\theta$ is carried out. Further, currents on the dc-qc rotary coordinate axis observed from the control viewpoint are used as current values used for calculation.

As another method, a technique in JP-A-9-191698 is known. In this technique, a motor induced voltage generated concurrently with rotation of the motor, as viewed from the stop state, is handled as external disturbance, and pursuant to the well-known external disturbance observer method, the magnitude and polarity of the motor induced voltage are estimated. Like the previously described prior art, the external disturbance observer is based on the state equation in the dc-qc rotary control coordinate system. Next, a speed is computed by using the estimated motor induced voltage and motor parameters and besides, the speed is integrated to provide position information so that a shift from the real rotation position may be corrected using position error $\Delta\theta$ obtained from a dc-axis component estimation value of induced voltage and the estimated speed.

In the calculation of $\Delta\theta$, the approximation of $\sin \Delta\theta = \Delta\theta$ is performed on the assumption that $\Delta\theta$ is close to zero as in the case of the previous example.

The conventional position-sensorless technique for medium/high-speed region utilizing the induced voltage, however, uses current values on the control rotary coordinate system representing the virtual rotary axis in order to estimate the motor position, and the approximation of $\sin \Delta\theta = \Delta\phi$ is carried out. For these reasons, the accuracy of control is degraded when the positional error is large. Accordingly, the prior art is unsuited for applications in which the load changes abruptly or the operation is accelerated/decelerated abruptly. In addition, when the motor parameters are involved, the estimated position becomes erroneous.

SUMMARY OF THE INVENTION

An object of the present invention is to provide, as a position-sensorless technique for medium/high-speed region, a control method suitable for driving a synchronous motor without resort to position sensor.

To accomplish the above object, the present inventor has studied the following points.

(1) Determining axis error $\Delta\theta$ by expressing the phase angle by a value not depending on the control axis;

(2) Determining a frequency on the basis of the axis error;

(3) Estimating a speed on the basis of current and voltage not depending on the control axis;

(4) Eliminating the influence of a parameter error contained in the axis error; and (5) Combining the operation method for stop/low-speed operation with the position-sensorless technique for medium/high-speed region.

In a position-sensorless control method of synchronous motor according to the invention made on the basis of the studies as above, a first phase difference between a motor current of a synchronous motor having a field system of a permanent magnet and a real rotary position, and a second phase difference between the motor current and a virtual rotary position are determined. From the difference between the first and second phase differences, a phase error between the real rotary position and the virtual rotary position is estimated. Since the first and second phase differences are used, the accuracy of control can be high even when the phase error is large.

DETAILED DESCRIPTION OF THE EMBODIMENTS

Embodiments of the invention will now be described with reference to FIGS. 1 to 16 in the accompanying drawings.

Figure 1:
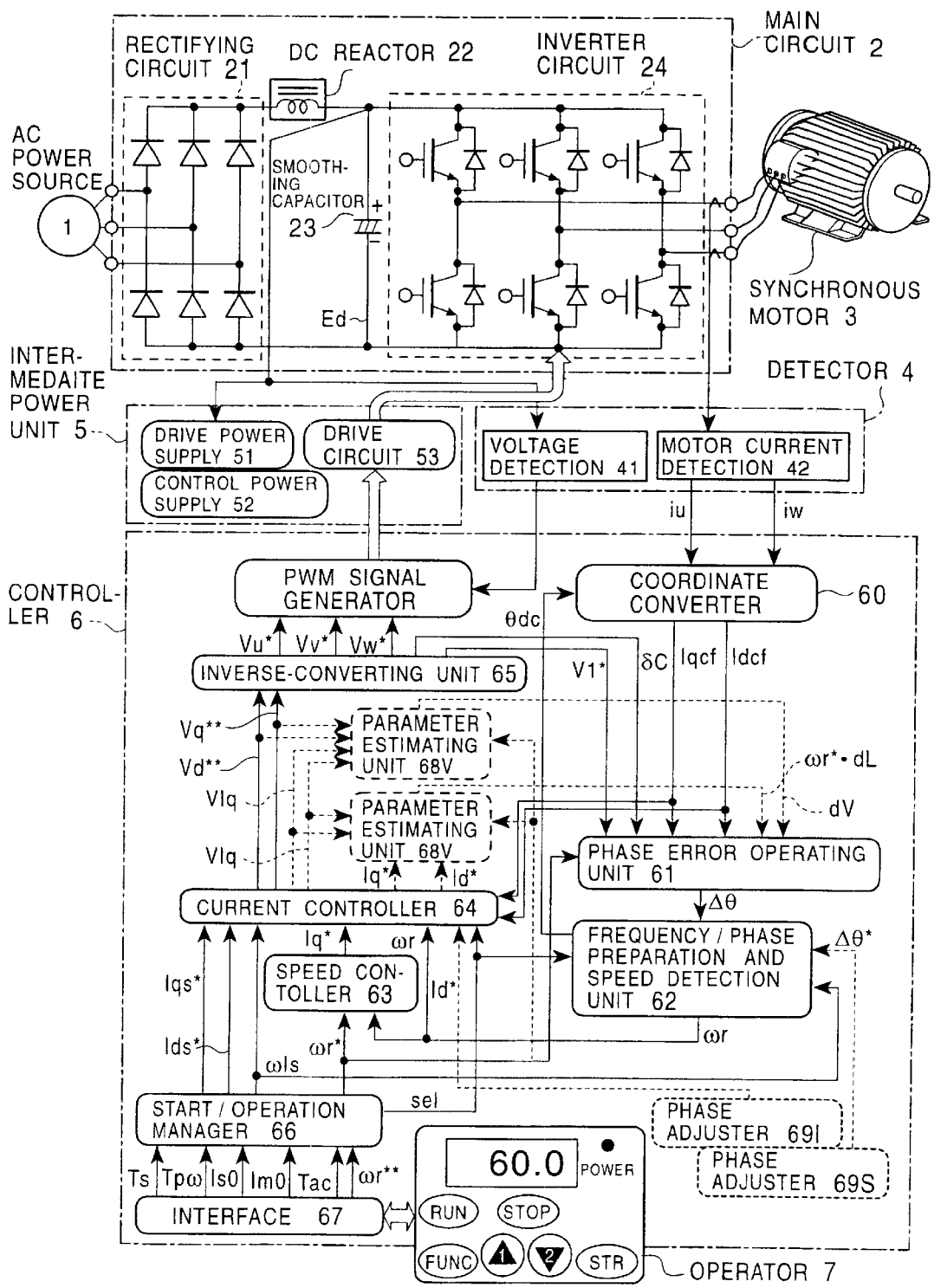
FIG. 1 is a diagram showing the overall construction of a system for implementing a position-sensorless controlling method of synchronous motor according to the invention.

Referring first to FIG. 1, there is illustrated a synchronous motor drive system to which a position-sensorless controlling method of synchronous motor according to the invention is applied. This system is mainly divided into a main circuit 2, a detector 4, an intermediate power unit 5 and a controller 6.

The main circuit 2 generates DC voltage $E_d$ from an AC power source 1 by using a rectifying circuit 21, a DC reactor 22 and a smoothing capacitor 23 so that an inverter circuit 24 may supply a three-phase alternating current of variable voltage and variable frequency to a synchronous motor 3.

The detector 4 includes a motor current detector 42 for detecting a motor current necessary for position-sensorless control, and a voltage detector 41 for detecting DC voltage $E_d$ necessary for controlling a voltage applied to the motor.

The intermediate power unit 5 includes a drive circuit 53 for driving switching elements constituting the inverter circuit 24, a drive power supply 51 for the drive circuit 53, and a control power supply 52 for the controller 6 to be described later.

In the controller 6, a control method according to the invention is applied. Essentially, the position-sensorless control in the present embodiment is a control operation on a dc-qc control rotary coordinate system from the control viewpoint having dc-axis representing virtual rotor positions from the control viewpoint and qc-axis representing positions from the control viewpoint 90° leading the dc-axis in the rotation direction, the dc-qc control rotary coordinate system being defined or established in relation to a d-q real rotary coordinate system having d-axis representing positions in the flux direction of the permanent magnet rotor and q-axis representing positions 90° leading the d-axis in the rotation direction. It will be appreciated that hereinafter, the dc-qc coordinate axis will simply be called "control axis".

A coordinate converter 60 receives motor currents iu and iw and phase $\theta_{dc}$ of the virtual rotor position dc-axis and delivers dc-axis current $I_{dcf}$ and qc-axis current $I_{qcf}$ on the virtual dc-qc coordinate system.

A phase error operating unit 61 receives the dc-axis current $I_{dcf}$, the qc-axis current $I_{qcf}$, motor voltage $V_1^*$ described hereinafter, and phase difference $\delta_c$ between the qc-axis and the motor voltage $V_1^*$ to deliver phase error $\Delta\theta$ between the d-q real coordinate system and the control axis system.

A frequency/phase preparation and speed detection detector 62 receives the phase error $\Delta\theta$ to compute detection speed $\omega_r$.

A speed controller 63 generates qc-axis current command $I_q^*$ from command speed $\omega_r^*$ and the detection speed $\omega_r$.

A current controller 64 generates qc-axis voltage command $V_q^{}$ and dc-axis voltage command $V_d^{}$ from the qc-axis current command $I_q^*$ and the detection speed $\omega_r$.

In an inverse-converting unit 65, three-phase voltage commands Vu*, Vv* and Vw* are prepared from the qc-axis voltage command $V_q^{}$ and dc-axis voltage command $V_d^{}$ to cause a PWM signal generator to generate a well-known PWM drive signal which in turn is transmitted to the drive circuit 53.

A start/operation manager 66 is adapted to implement an operation method during stop and low-speed operation. The manager 66 transmits qc-axis current command $I_{qs}^*$ during start (hereinafter referred to as "starting qc-axis current command $I_{qs}^*$") and starting dc-axis current command $I_{ds}^*$ to the current controller 64. The manager 66 also transmits speed command $\omega_{1s}$ during start (or starting speed command $\omega_{1s}$) to the current controller 64 and the frequency/phase preparation and speed detection unit 62. A selection signal sel represents signal data for switching between the operation method during start and the operation method based on the position-sensorless control, and is transmitted to the current controller 64 and frequency/phase preparation and speed detection unit 62.

An operator 7 is adapted to permit a manual operation of an operation stop command and a speed command, display a speed, and set various operation parameters. An interface 67 operates to transmit various kinds of data set by the operator 7 to the start/operation manager 66. The data includes, in addition to speed command $\omega_r^{**}$ and acceleration time $T_{ac}$, positioning time $T_p$ for optimizing start operation under various load conditions, initial rotation time $T_s$, positioning target current command $I_{mo}$, and initial rotation final target frequency $\omega_{1so}$.

A parameter estimating unit 68V, a parameter estimating unit 68L, a phase adjuster 69I and a phase adjuster 69S, all indicated by dotted line in the controller 6, are adapted to eliminate the influence of motor constants contained in the phase error $\Delta\theta$ determined by the phase error operating unit 61.

The parameter estimating unit 68V alleviates the influence of an error between the voltage commands $V_u^*$, $V_v^*$ and $V_w^*$ and an actual voltage upon the phase error $\Delta\theta$, and the parameter estimating unit 68L alleviates the influence of an actual inductance of the motor, differing from motor inductance setting value L used in the phase error computation, upon the phase difference $\Delta\theta$. Either the phase adjuster 69I or the phase adjuster 69L is adapted to alleviate the influence of a plurality of motor constants and a motor voltage error upon the phase error. The phase adjuster 69I generates the dc-axis current command Id* and the phase adjuster 69S generates phase error command $\Delta\theta^*$, in order that the motor current can be minimized.

Next, a method of estimating the rotor position of the synchronous motor in the present embodiment will be described.

Figure 2:
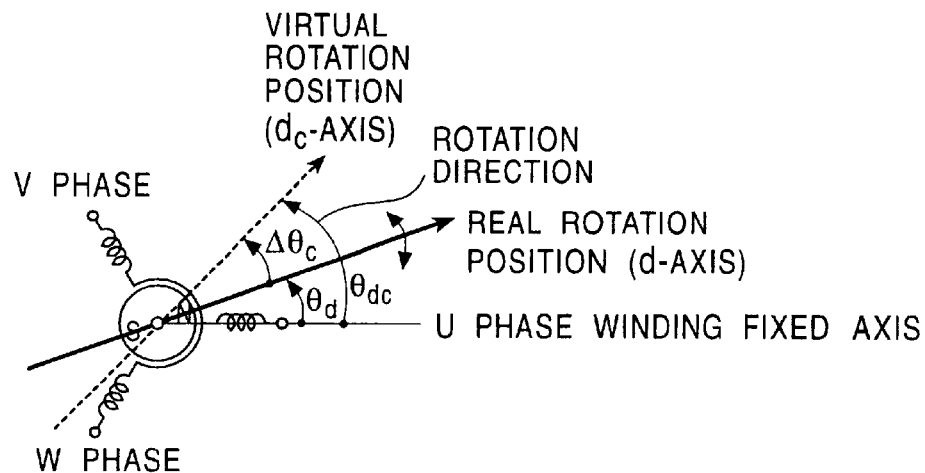
FIG. 2 is an analytical model diagram showing the relation between the rotor, the stator, the d-q rotary coordinates and dc-qc control rotary coordinates in the synchronous motor.

Referring to FIG. 2, there is illustrated the relation between the rotor, the stator, the d-q rotary coordinates and the dc-qc control rotary coordinates in the synchronous motor. FIG. 2 is an analytical model diagram of the synchronous motor, indicating the rotation angle in terms of an electrical angle of an AC voltage for driving the motor. As described previously, the d-axis is positioned in the flux direction of the permanent magnet rotor. The dc-axis is defined as a virtual rotor position from the control viewpoint. The phase of the rotating d-axis is referenced to a U-phase winding axis of the stator and is indicated by $\theta_d$. The phase of the dc-axis is also referenced to the U-phase winding axis of the stator, and is indicated by $\theta_{dc}$. The polarity of phase is defined as positive when the rotation direction of the rotary coordinate axis is counterclockwise. The phase of the dc-axis as viewed from the d-axis is defined as phase error $\Delta\theta$. In the present embodiment, for the sake of estimating the rotor position, the phase error $\Delta\theta$ is determined through computation.

Figure 3:
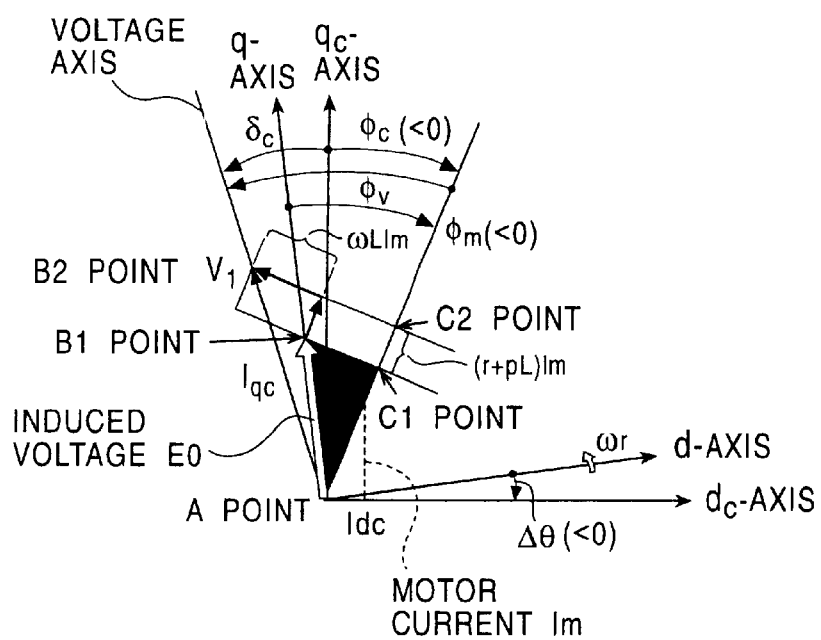
FIG. 3 is a vector diagram when an AC voltage drives the synchronous motor and the rotor is rotating in the positive (forward) direction.

Referring to FIG. 3, there is illustrated a vector diagram when the synchronous motor is driven by the AC voltage and the rotor is rotating in the positive direction. In the FIGURE, $V_1$ represents motor voltage, $I_m$ represents motor current, and $E_o$ represents induced voltage. Since the phase of the induced voltage $E_o$ leads by 90° to the rotor flux axis, the induced voltage $E_o$ is in phase with the q-axis. Further, the phase between the motor current $I_m$ and the motor voltage $V_1$ is defined as $\phi_v$, the phase of the motor voltage $V_1$ as viewed from the qc-axis is defined as $\delta_c$, the phase of the current $I_m$ as viewed from the qc-axis is defined as $\phi_c$ (second phase difference), and the phase of the current $I_m$ as viewed from the q-axis is defined as $\phi_m$ (first phase difference).

When the motor voltage $V_1$ is decomposed to d-axis component $v_d$ and q-axis component $v_q$, a voltage equation of equation (1) is given using d-axis component $I_d$ and q-axis component $I_q$ of the motor current $I_m$, the induced voltage $E_o$, the motor winding resistance r and motor winding inductance L representing the motor constants, and the rotation speed $\omega_r$ of the d-q coordinates, where p is an operator indicative of differential operation.

$$\begin{bmatrix} v_d \\ v_q \end{bmatrix} = (r+pL)\begin{bmatrix} i_d \\ i_q \end{bmatrix} + \omega_r L \begin{bmatrix} -i_q \\ i_d \end{bmatrix} + \begin{bmatrix} 0 \\ E_o \end{bmatrix} \quad \text{Equation (1)}$$

The square root of the square-sum of $v_d$ and $v_q$ on the left side in equation (1) indicates the magnitude $|V_1|$ of the motor voltage $V_1$. The magnitude is related to dc-axis component $v_{dc}$ and qc-axis component $V_{qc}$ on the control axis by the following equation, and does not depend on the position of the control axis.

$$|v_1| = \sqrt{v_d^2 + v_q^2} = \sqrt{v_{dc}^2 + v_{qc}^2} \quad \text{Equation (2)}$$

On the right side in equation (1), the first term indicates a voltage drop vector in the same direction as the motor current $I_m$, and the second term indicates a voltage drop vector in a direction resulting from 90° rotation of the current $I_m$. The magnitude of each of the voltage drop vectors is given by the following equation, where the motor current $I_m$ has control axis components $I_{qc}$ and $I_{dc}$ and its magnitude $|I_m|$.

$$(r+pL)\sqrt{i_d^2+i_q^2} = (r+pL)\sqrt{i_{dc}^2+i_{qc}^2} = (r+pL)\cdot|I_m|\,\omega_r L\sqrt{i_d^2+i_q^2} = \omega_r L \sqrt{i_{dc}^2+i_{qc}^2} = \omega_r L \cdot |I_m| \quad \text{Equation (3)}$$

In other words, the magnitude of each voltage drop vector has no relation to the positional relation between the control axis and the real axis, and is expressed by the magnitude of the motor current $I_m$.

For simplicity of explanation, the magnitude of the motor voltage $V_1$ and the magnitude of the motor current $I_m$ are hereinafter simply indicated by $V_1$ and $I_m$, respectively.

In the present embodiment, when determining the phase error $\Delta\theta$, the aforementioned phases $\phi_c$ and $\phi_m$ are selected to express the phase error $\Delta\theta$ by equation (4).

$$\Delta\theta = \phi_m - \phi_c \quad \text{Equation (4)}$$

The phase $\phi_c$ can be determined from the observable values $I_{dc}$ and $I_{qc}$ of the motor current $I_m$ on the dc-qc axis pursuant to equation (5).

$$\phi_c = \tan^{-1}\left(-\frac{I_{dc}}{I_{qc}}\right) \quad \text{Equation (5)}$$

Next, an equation for derivation of the phase $\phi_m$ will be described. In the vector diagram shown in FIG. 3, right-angled triangle (A–B$_1$–C$_1$) is noticed. The base (A–C$_1$) of the right-angled triangle has a length equal to a difference of subtraction of side (C$_1$–C$_2$) from side (A–C$_2$), which length is determined by equation (6). In equation (6), the length of the side has sign information.

$$\text{SIDE}(A-C_1) = V_1 \cos \phi_v - (r+PL)\cdot I_m \quad \text{Equation (6)}$$

The height of the right-angled triangle is determined by subtracting a voltage drop across motor winding inductance from side (B$_2$–C$_2$) pursuant to equation (7). In equation (7), too, the length of the side has sign information.

$$\text{SIDE}(B_1-C_1) = V_1 \sin \phi_v - \omega_r L \cdot I_m \quad \text{Equation (7)}$$

Further, oblique side (A-B$_1$) of the right-angled triangle equals the length of the induced voltage vector $E_o$, and determined pursuant to equation (8), where $k_E$ represents a generation constant.

$$\text{SIDE}(A-B_1) = k_E \cdot \omega_r \quad \text{Equation (8)}$$

In addition, $\phi_v$ in equations (6) and (7) can be determined pursuant to the following equation.

$$\phi_v = \delta_c - \phi_c \quad \text{Equation (9)}$$

$$\delta_c = \tan^{-1}\left(-\frac{v_{dc}}{v_{qc}}\right)$$

As will be seen from the above, the lengths of the three sides of the right-angled triangular $(A-B_{1\,-C1})$ are observable by the controller 6, and can be determined by quantities unaffected by the position of the control axis.

From the above, the angle $\phi_m$ of the right-angled triangle can be determined pursuant to the following three equations (10) to (12) as below.

$$\phi_m = \tan^{-1}\left(-\frac{V_1 \sin\phi_v - \omega_r L I_m}{V_1 \cos\phi_v - (r+pL)I_m}\right) \quad \text{Equation (10)}$$

$$\phi_m = \cos^{-1}\left(-\frac{V_1 \cos\phi_v - (r+pL)I_m}{k_E \omega_r}\right) \quad \text{Equation (11)}$$

$$\phi_m = \sin^{-1}\left(-\frac{V_1 \sin\phi_v - \omega_r L I_m}{k_E \omega_r}\right) \quad \text{Equation (12)}$$

As the inverse functions of the trigonometric function in equations (5), (9) and (10), the expanded functions are used in which the output range of the function is extended to $-\pi$ to $\pi$ [rad]. Unless specifically noted, the inverse function of the trigonometric function used in the present embodiment is the aforementioned expanded function.

As described above, in the present embodiment, the phase $\phi_m$ can be determined from the quantities that are independent of the control axis. Further, in the present embodiment, the frequency of the AC voltage applied to the motor is so modified as to make the phase error $\Delta\theta$ zero on the basis of the magnitude of the phase error $\Delta\theta$. By controlling the frequency in this manner, the control axis representing the virtual rotary axis can be rotated in phase with the rotor of the motor.

In the foregoing, the rotation direction of the motor rotor is exemplified as being positive but in the case of the inverse rotation direction, the phase $\phi_m$ can be determined similarly by taking the sign of the denominator and numerator into consideration when expanding the output range of the function to $-\pi$ to $\pi$ [rad] during calculation of the $\phi_m$.

Incidentally, from the aforementioned relation between the three sides of the right-angled triangle $(A-B_{1\,-C1})$, $$(k_E \omega_r)^2 = (V_1 \sin\phi_v - \omega_r L I_m)^2 + (V_1 \cos\phi_v - (r+pL)I_m)^2 \quad \text{Equation (13)}$$

can be obtained, and based on this equation (13), the motor speed can be expressed as follows.

$$\omega_r = \frac{-(LI_m \cdot V_1 \sin\phi_v) + \sqrt{(LI_m \cdot V_1 \sin\phi_v)^2 + (k_E^2 - (LI_m)^2) \cdot \{(V_1 \sin\phi_v)^2 + (V_1 \cos\phi_v - (r+pL)I_m)^2\}}}{(k_E^2 - (LI_m)^2)} \quad \text{Equation (14)}$$

In the calculation of the $\phi_m$ pursuant to equation (10) or (11) and the calculation of the motor speed pursuant to equation (14), the term indicative of the current change component $pL \cdot I_m$ can be neglected if the response of the control system is high, and the values of the resistance r and $\omega L$ can be neglected if they are sufficiently smaller than other values.

Figure 4:
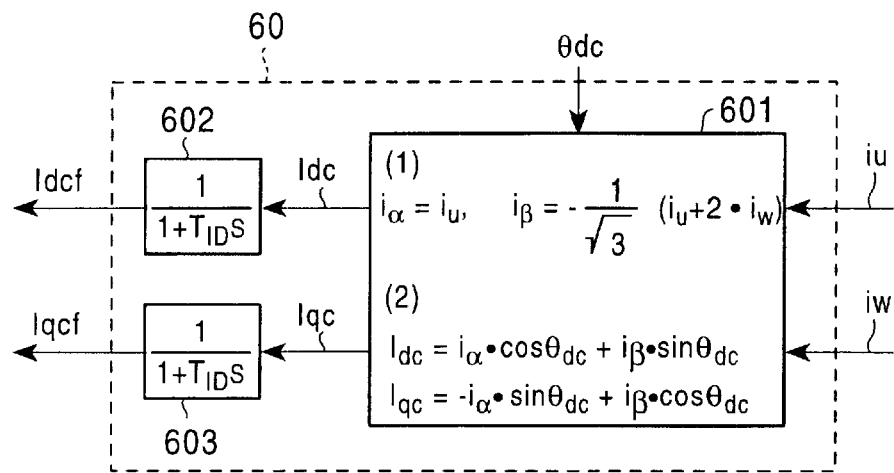
FIG. 4 is a diagram showing, in block form, the contents of computation in a coordinate converter.

Next, the contents of computation in the coordinate converter 60 will be described with reference to FIG. 4.

The observation currents iu and iw delivered out of the motor current detector 42 and the phase $\theta_{dc}$ delivered out of the frequency/phase preparation and speed detection unit 62 are delivered to an operating section 601. In the operating section 601, two-phase currents $i_\alpha$ and $i_\beta$ on the fixed coordinate axis are computed from the iu and iw, and then the currents $I_{dc}$ and $I_{qc}$ on the dc-qc coordinate axis are computed using the phase $\theta_{dc}$. The current $I_{dc}$ is inputted to a filter 602. In the filter 602, the current $I_{dcf}$ resulting from the removal of the high frequency components from the observation current $I_{dc}$ is computed. The current $I_{qc}$ is inputted to a filter 603. In the filter 603, the current $I_{qcf}$ resulting from the removal of the high frequency components from the observation current $I_{qc}$ is computed. The filters 602 and 603 operate to eliminate the switching ripple and noise contained in the motor current. Time constant $T_{ID}$ of the filter is set to a predetermined value conforming to the switching frequency of the inverter and the circuit specifications of the motor current detector 42.

Figure 5:
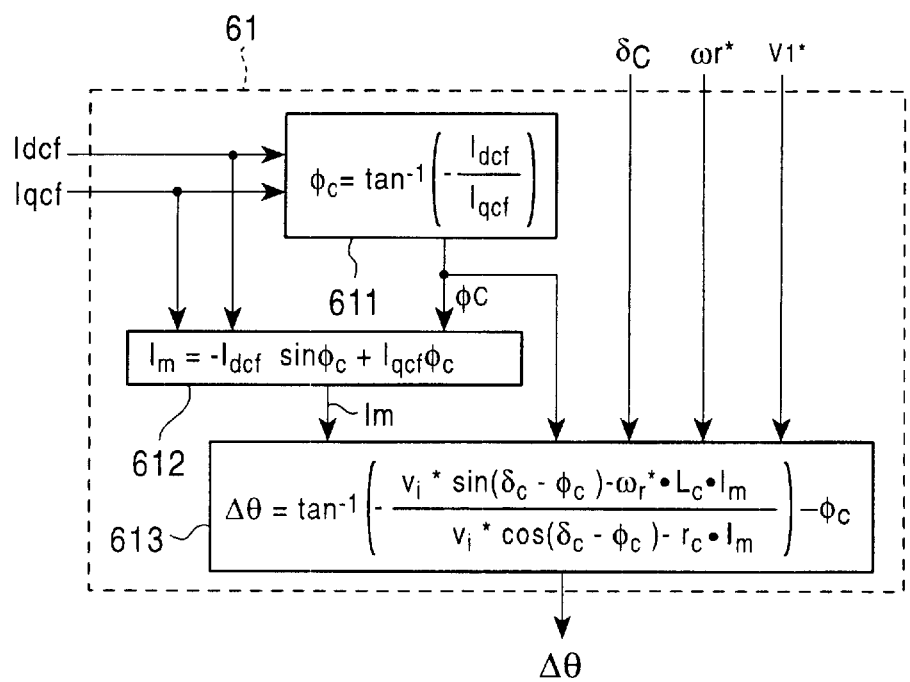
FIG. 5 is a diagram showing, in block form, the contents of computation in a phase error operating unit.

Referring now to FIG. 5, the contents of computation in the phase error operating unit 61 will be described.

In the phase error operating unit 61, the phase $\theta_m$ is calculated pursuant to equation (10). This calculation differs from the calculation of the axis error $\Delta\theta$ described previously in that as the motor voltage $V_1$, the motor winding resistance r and motor winding inductance L representing the motor constants are needed for the calculation of phase $\phi_m$, the command value $V_1^*$ for the motor voltage, the motor winding resistance setting value $r_c$ and the motor winding inductance setting value $L_c$ are used, respectively, and that the motor speed command $\omega_r^*$ is used for the rotation speed 107 $r$. Besides, on the assumption that the response of the control system is sufficiently high, the term of the current change component $(pL \cdot I_m)$ is neglected.

The observation currents $I_{dcf}$ and $I_{qcf}$ delivered out of the coordinate converter 60 are inputted to the operating sections 611 and 612. In the operating section 611, the phase $\phi_c$ is computed pursuant to equation (15).

$$\phi_c = \tan^{-1}\left(-\frac{I_{dcf}}{I_{qcf}}\right) \quad \text{Equation (15)}$$

The phase $\phi_c$ as above is inputted to the operating sections 612 and 613. In the operating section 612, the magnitude $I_m$ of the motor current is computed pursuant to equation (16).

$$I_m = -I_{dcf}\sin\phi_c + I_{qcf}\cos\phi_c \quad \text{Equation (16)}$$

The motor voltage command $V_1^*$ and phase $\delta_c$ delivered out of the inverse-converting unit 65 are inputted to the operating section 613. The motor speed command $\omega_r^*$ delivered out of the start/operation manager 66 is also inputted to the operating section 613. In the operating section 613, the phase error $\Delta\theta$ is computed from the inputted $V_1^*$, $I_m$, $\omega_r^*$, $\delta_c$ and $\phi_c$ as well as the motor winding resistance setting value $r_c$ and the motor winding inductance setting value $L_c$ pursuant to equation (17). According to the present embodiment, the phase error can be estimated directly without using the approximation of sin $\Delta\theta=\Delta\theta$ and so forth. Accordingly, the accuracy of control can be high even when the phase error is large.

$$\Delta\theta = \tan^{-1}\left(\frac{V_1^*\sin(\delta_c - \phi_c) - \omega_r^* L_c I_m}{V_1^*\cos(\delta_c - \phi_c) - r_r I_m}\right) - \phi_c \qquad \text{Equation (17)}$$

Figure 6:
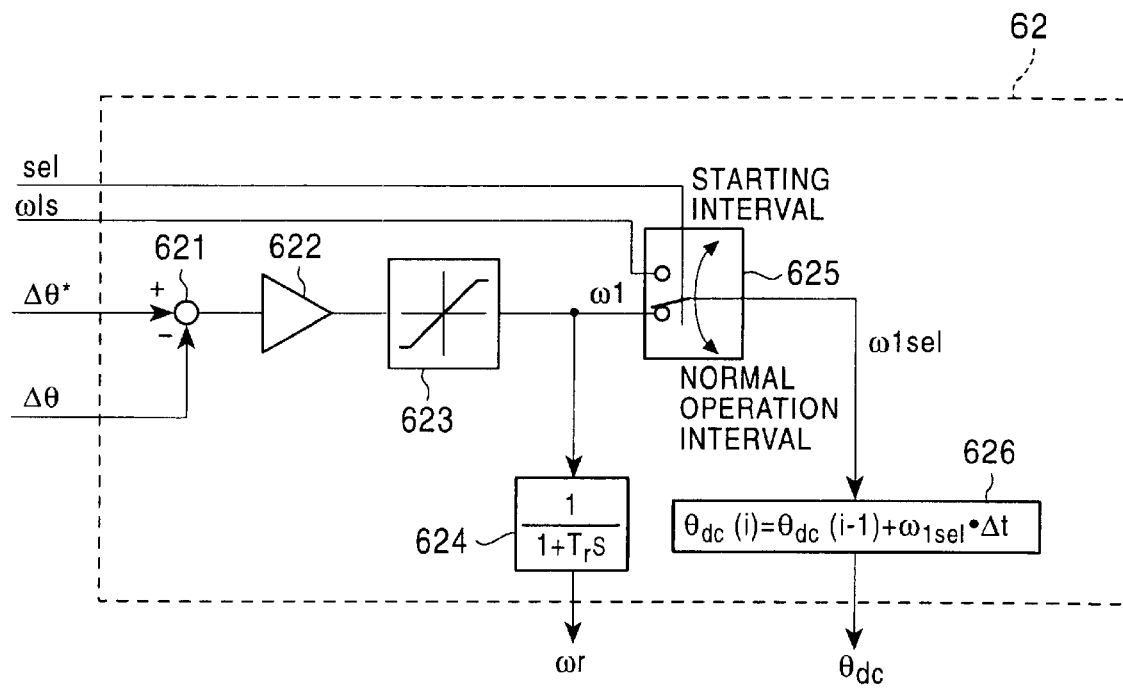
FIG. 6 is a diagram showing, in block form, the contents of computation in a frequency/phase preparation and speed detection unit.

Referring now to FIG. 6, the contents of computation in the frequency/phase preparation and speed detection unit 62 will be described.

The phase error $\Delta\theta$ delivered out of the phase error operating unit 61 and the phase error command $\Delta\theta^*$ delivered out of the phase adjuster 69s are inputted to an adder 621, and difference $(\Delta\theta^*) - \Delta\theta$ is computed. As the phase error command $\Delta\theta^*$, a value that is effective when the phase adjuster 69S is used as will be described later is inputted, and in case the phase adjuster 69S is not used, $\Delta\theta^* = 0$ is set. The difference $(\Delta\theta^*) - \Delta\theta$ is inputted to a PI compensator 622.

The PI compensator 622 cooperates with a limiter 623 to compute inverter output frequency $\omega_1$. The inverter output frequency $\omega_1$ is inputted to a filter 624 in which the high-frequency change components are removed from the frequency $\omega_1$ to compute the motor speed $\omega_r$.

The inverter output frequency $\omega_1$, the selecting signal sel delivered out of the start/operation manager 66, and the starting speed signal $\omega_{1s}$ are inputted to a selector 625. In the selector 625, the $\omega_{1s}$ is selected and delivered when the selecting signal sel is "starting interval" indicative of a positioning initial rotation mode to be described later, but the $\omega_1$ is selected and delivered when the selecting signal is "normal operation interval" indicative of a position-sensorless operation mode to be described later.

A frequency $\omega_{1sel}$ selectively delivered out of the selector 625 is inputted to an operating section 626. In the operating section 626, the phase $\theta_{dc}$ is computed on the basis of the value of the frequency $\omega_{1sel}$.

The PI compensator 622 computes the inverter output frequency $\omega_1$ such that the $\Delta\theta$ follows the $\Delta\theta^*$. Means different from the PI compensator but having a similar function may be used. For setting of the upper limit value and lower limit value in the limiter 623, a predetermined fixed value exceeding a rated frequency can be set as the upper limit value. The polarity of the upper limit value is inversed to provide a value to which the lower limit value is set, and the thus set lower limit value is used as a limit value when the motor rotation direction is inversed.

Because of adjustment of the phase error $\Delta\theta$, the output of the PI compensator 622 constantly changes, thus containing the high-frequency components. Accordingly, when the speed control of the motor is carried out using the output of the PI compensator 622 as a detection speed of the motor, the speed control characteristic is degraded. Therefore, in the present embodiment, the low-pass filter 624 is provided in order that the detection speed of the motor removed of the high-frequency components can be obtained.

In the operating section 626, the phase $\theta_{dc}$ is determined on the basis of the inputted frequency. It will be appreciated that in the operating section 626 shown in FIG. 6, the computation procedure of the frequency/phase preparation and speed detection unit 62 is executed by software, and computation is carried out at a time interval of control frequency $\Delta t$. In the phase computation, the previous phase $\theta_{dc}(i-1)$ is added by $\omega_{1sel} \times \Delta t$ to provide the present phase $\theta_{dc}(i)$.

As described above, in FIG. 6, the output of the PI compensator 622 contains the high-frequency components responsible for adjustment of the motor detection speed and the phase error $\Delta\theta$. For this reason, for determination of the detection speed, the output of the PI compensator 622 as it is cannot be used for the speed control, and the high-frequency components are removed by means of the low-pass filter. As another embodiment, a method will now be described in which the motor rotation speed is estimated to dispense with the low-pass filter.

Figure 7:
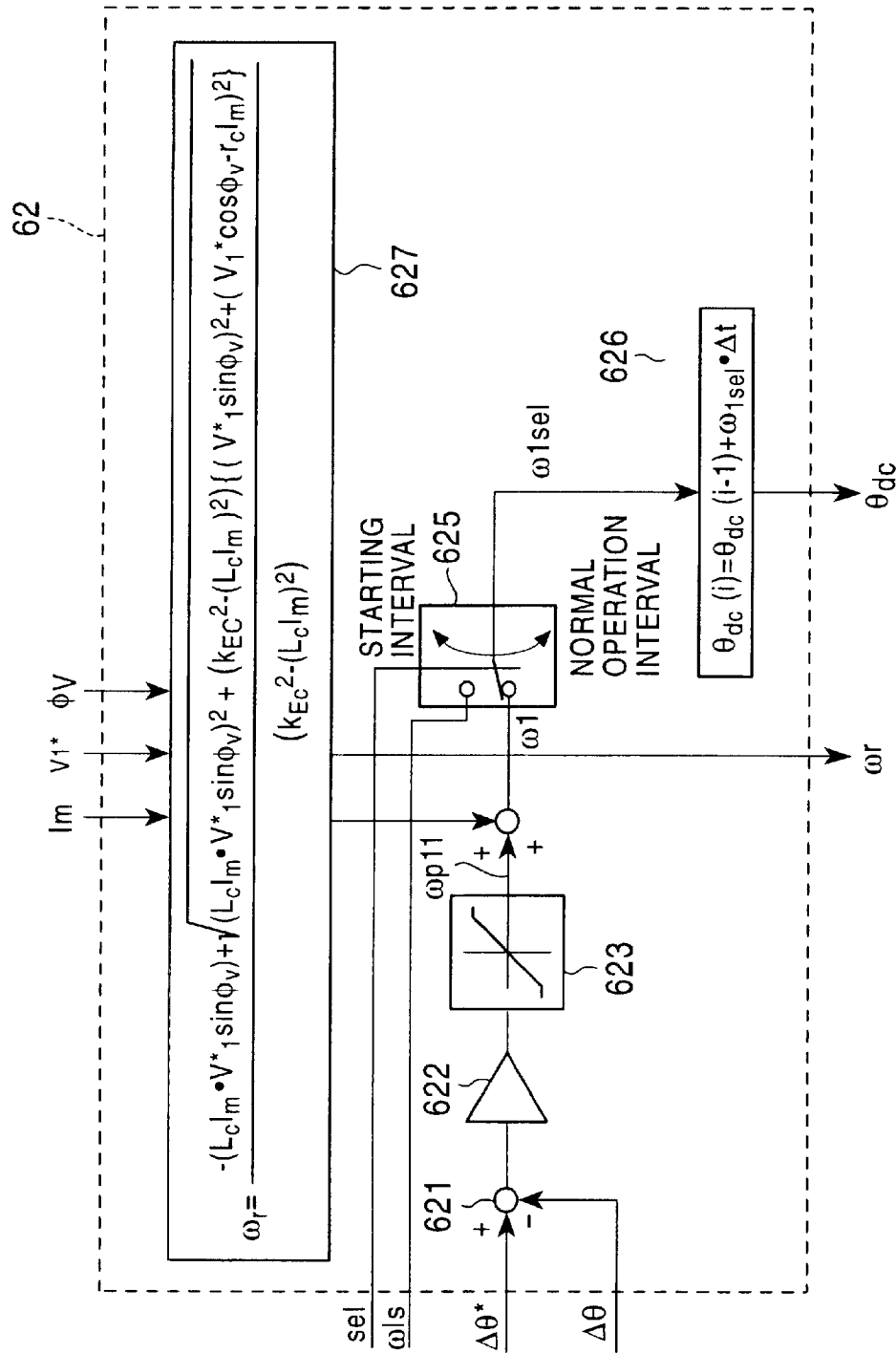
FIG. 7 is diagram showing, in block form, another example of the contents of computation in the frequency/ phase preparation and speed detection unit.

Thus, another example of construction of the frequency/phase preparation and speed detection unit 62 is illustrated in FIG. 7. The inverter output frequency $\omega_1$ is determined as the sum of the first and second frequencies, the first frequency is defined as a motor speed determined pursuant to equation (14) by using the magnitude of the motor current, the magnitude of the motor voltage, the phase difference between the motor current and the motor voltage, the motor induced voltage constant, the motor winding resistance and the motor winding inductance. The second frequency is defined as a frequency for making $\Delta\theta$ equal to $\Delta\theta^*$. The magnitude $I_m$ of the motor current, the motor voltage command value $V_1^*$, and the phase difference $\phi_V$ between the motor current and motor voltage are inputted to an operating section 627, and the motor speed $\omega_r$ indicative of the first frequency is computed. But, this computation differs from that based on equation (14) in that motor voltage $V_1$ is replaced with $V_1^*$, the motor winding resistance r is replaced with $r_c$, the motor winding inductance L is replaced with $L_c$, the motor generation constant $K_E$ is replaced with the motor generation constant setting value $K_{EC}$, and the term (pL, $I_m$) indicative of the current change component is neglected, and is carried out pursuant to the following equation.

$$\omega_r = \frac{-(L_c I_m \cdot v_1^* \sin\phi_V) + \sqrt{(L_c I_m \cdot v_1^* \sin\phi_V)^2 + (k_{Ec}^2 - (L_c I_m)^2) \cdot \{(v_1^* \sin\phi_V)^2 + (v_1^* \cos\phi_V) - r_c I_m)^2\}}}{(k_{Ec}^2 - (L_c I_m)^2)} \qquad \text{Equation (18)}$$

The PI compensator 622 inputted with the difference between $\Delta\theta^*$ and $\Delta\theta$ is combined with a limiter 623 to compute the second frequency $\omega_{p11}$.

The motor detection speed $\omega_r$ and the second frequency $\omega_{p11}$ are inputted to an adder 628, and the sum of the two is computed to deliver the inverter output frequency $\omega_1$. Here, the output of the PI compensator 622 is the high-frequency components responsible for adjustment of the phase error $\Delta\theta$. Accordingly, the upper limit and lower limit values of the limiter 623 can be smaller than those of the limiter shown previously in FIG. 6.

In the embodiments shown in FIGS. 6 and 7, the phase error $\Delta\theta$ is made to be conformable to the phase error command $\Delta\theta^*$ and consequently, the inverter output frequency is modified by means of the PI compensator 622. A still another method will now be described in which the phase error $\Delta\theta$ is made to be conformable to the phase error command $\Delta\theta^*$ by directly modifying the computed phase $\theta_{dc}$.

Figure 8:
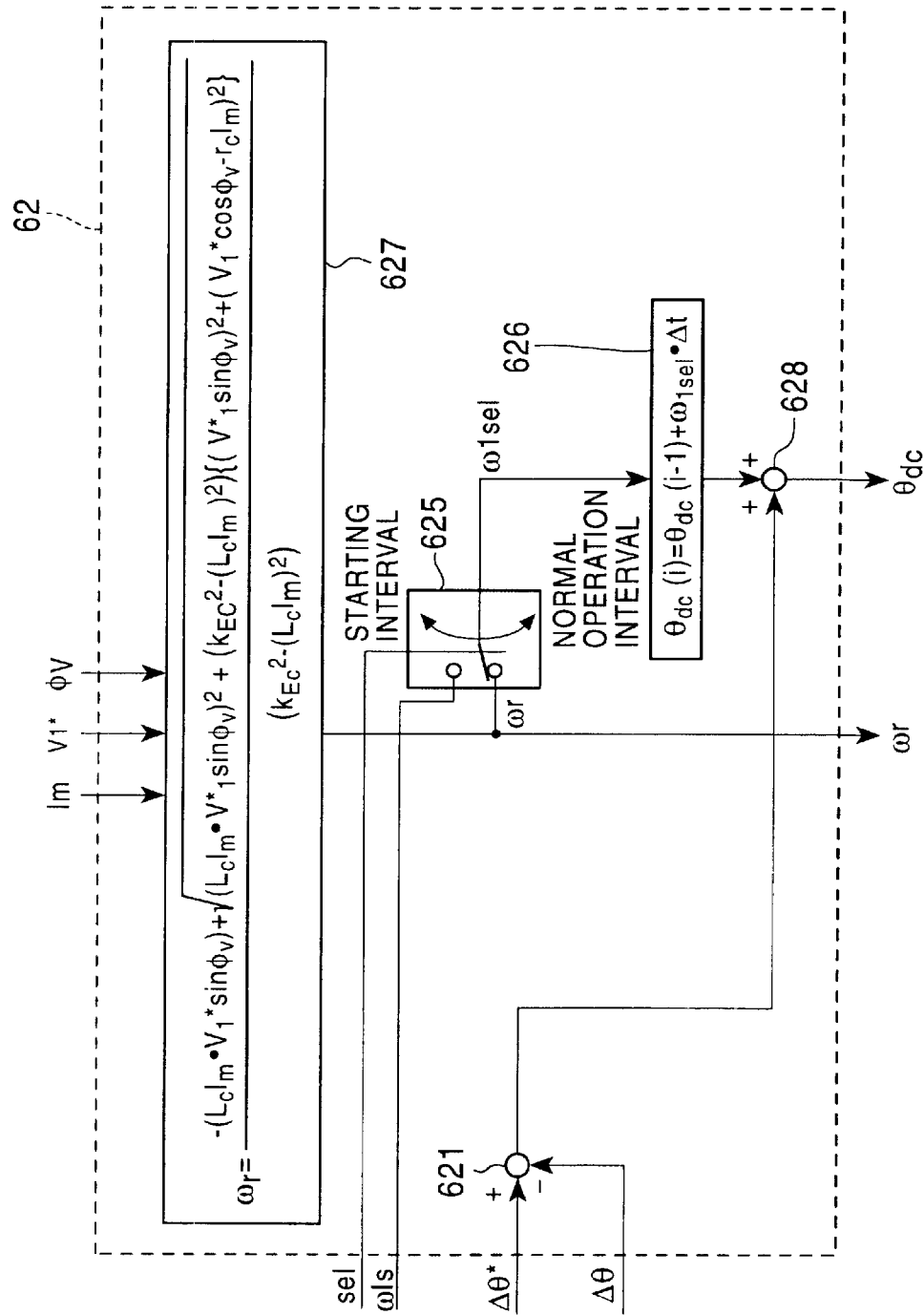
FIG. 8 is a diagram showing, in block form, still another example of the contents of computation in the frequency/ phase preparation and speed detection unit.

Still another example of construction of the frequency/phase preparation and speed detection unit 62 is illustrated in FIG. 8. Here, portions different from those in FIG. 7 will be explained in connection with signal connection and flow.

The detection signal $\omega_r$, the selecting signal sel and the starting speed signal $\omega_{1s}$ are inputted to the selector 625. The selector 625 selects $\omega_r$ or $\omega_{1s}$ in accordance of the value of the selecting signal sel to deliver the selection speed $\omega_{1sel}$. In the operating section 626, a phase is computed on the basis of the value of the frequency of $\omega_{1sel}$. The output phase of the operating section 626 and the output $(\Delta\theta^*)-\Delta\theta$ of the adder 621 are inputted to an adder 628, and the phase $\theta_{dc}$ is delivered. The phase delivered out of the operating section 626 is directly modified by the amount of the phase shift $(\Delta\theta^*)-\Delta\theta$ delivered out of the adder 621. Consequently, the PI compensator and limiter needed for the example in FIG. 7 can be dispensed with to decrease the amount of the operation in the controller.

Figure 9:
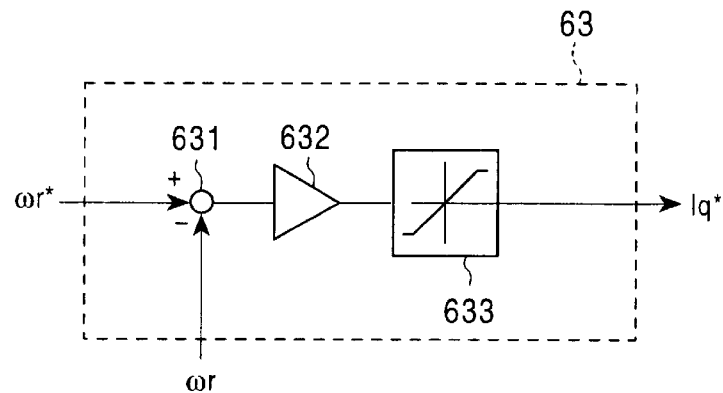
FIG. 9 is a diagram showing, in block form, the contents of computation in a speed controller.

Referring now to FIG. 9, the speed controller 63 will be described. The speed command $\omega_r^*$ delivered out of the start/operation manager 66 and the detection speed $\omega_r$ delivered out of the frequency/phase preparation and speed detection unit 62 are inputted to an adder 631. In the adder 631, $(\omega_r^*)-\omega_r$ is computed, and the difference is inputted to the PI compensator 632. In the PI compensator 632, the current command value is computed which causes the $\omega_r$ to follow the $\omega_r^*$. The output of the PI compensator 632 is inputted to a limiter 633. In the limiter 633, the inputted value is subjected to the limit operation so as not to exceed the precedently set upper limit and lower limit values, and q-axis current command $I_q^*$ is delivered.

Figure 10:
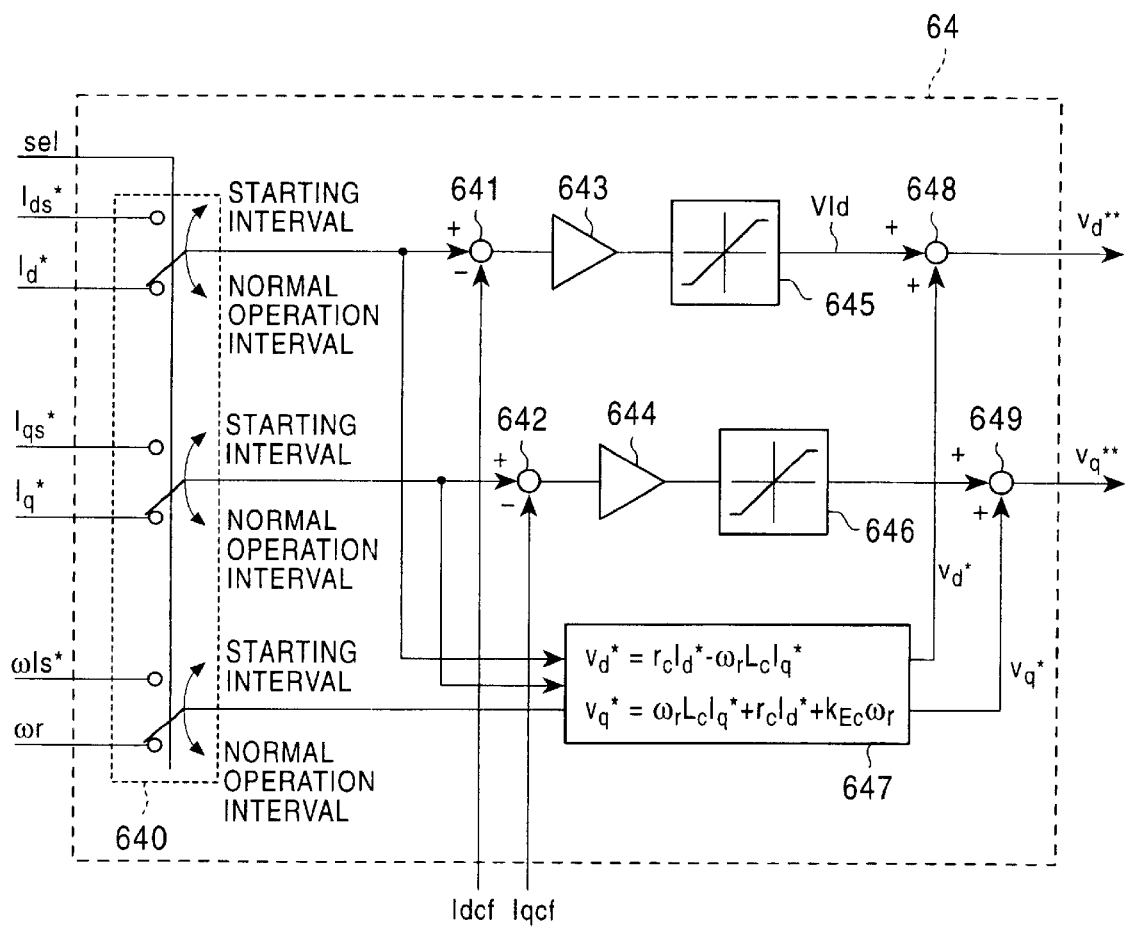
FIG. 10 is a diagram showing, in block form, the contents of computation in a current controller.

Referring now to FIG. 10, the contents of the current controller 64 will be described in greater detail.

A pair of the detection speed $\omega_r$ delivered out of the frequency/phase preparation and speed detection unit 62 and the speed command $\omega_{1s}$ delivered out of the start/operation manager 66, a pair of the current command $I_q^*$ delivered out of the speed controller 63 and the current command $I_{qs}^*$ delivered out of the start/operation manager 66, and a pair of the current command $I_d^*$ delivered out of the phase adjuster 69I and the $I_{ds}^*$ delivered out of the start/operation manager 66 are inputted to respective selection elements of a selector 640. Then, in accordance with the selecting signal sel inputted to the selector 640, the starting d-axis current command $I_{ds}^*$, the starting q-axis current command $I_{qs}^*$ and the starting speed command $\omega_{1s}$ are selected and delivered when the selecting signal sel indicates "starting interval" and the d-axis current command $I_d^*$, the q-axis current command $I_q^*$ and the detection speed $\omega_r$ are selected and delivered when the selecting signal sel indicates "normal operation interval".

The d-axis current command $I_{ds}^*$ or $I_d^*$ selected by the selector 640 and the d-axis current $I_{dcf}$ delivered out of the coordinate converter 60 are inputted to an adder 641, and a difference between the two is computed. In a PI compensator 643, a compensation voltage for making the output of the adder 641 zero is computed. The compensation voltage is inputted to a limiter 645 in which its value is so processed as not to exceed the precedently set upper limit and lower limit values, and d-axis compensation voltage $VI_d$ is delivered out of the limiter.

On the other hand, the q-axis current command $I_{qs}^*$ or $I_q^*$ selected by the selector 640 and the q-axis current $I_{qcf}$ delivered out of the coordinate converter 60 are inputted to an adder 642, and a difference between the two is computed. In a PI compensator 644, a compensation voltage for making the output of the adder 642 zero is computed. The compensation voltage is inputted to a limiter 646, and processed such that its value does not excess the precedently set upper limit and lower limit values, and q-axis compensation voltage $VI_q$ is delivered out of the limiter.

In addition, the d-axis current command $I_{ds}^*$ or $I_d^*$, the q-axis current command $I_{qs}^*$ or $I_q^*$ and the starting speed command $\omega_{1s}$ or the detection speed $\omega_r$ are inputted to a motor voltage model 647, and d-axis model voltage $V_d^*$ and q-axis model voltage $V_q^*$ are delivered. In case $I_d^*$, $I_q^*$ and $\omega_r$ are used for the motor voltage model, the d-axis and q-axis model voltages are expressed by the following equation.

$$V_d^* = r_c I_d^* - \omega_r L_c I_q^*$$

$$V_q^* = \omega_r L_c I_d^* + r_c I_q^* + K_{Ec} \omega_r \qquad \text{Equation (19)}$$

As will be seen from the above equation, the motor voltage models can be derived from equation (1), and as compared to equation (1), the current change term is omitted, the voltage and the current are all replaced with the command values, and the motor constants are all replaced with the setting values.

The d-axis compensation voltage $VI_d$ and the d-axis model voltage $V_d^*$ are inputted to an adder 648, and the sum of the two is delivered as dc-axis voltage command $V_d^{**}$. Similarly, the q-axis compensation voltage $VI_q$ and the q-axis model voltage $V_q^*$ are inputted to an adder 649, and the sum of the two is delivered as qc-axis voltage command $V_q^{**}$.

In case any of the resistance setting value $r_c$, the winding inductance setting value $L_c$ and the generation constant $K_{Ec}$ differ from the actual values, the d-axis compensation voltage $VI_d$ and the q-axis compensation voltage $VI_q$ produce certain values even during an accelerating/decelerating operation or a normal operation, and in other cases, they have values of zero.

Next, the inverse-converting unit 65 will be described with reference to FIG. 11.

Figure 11:
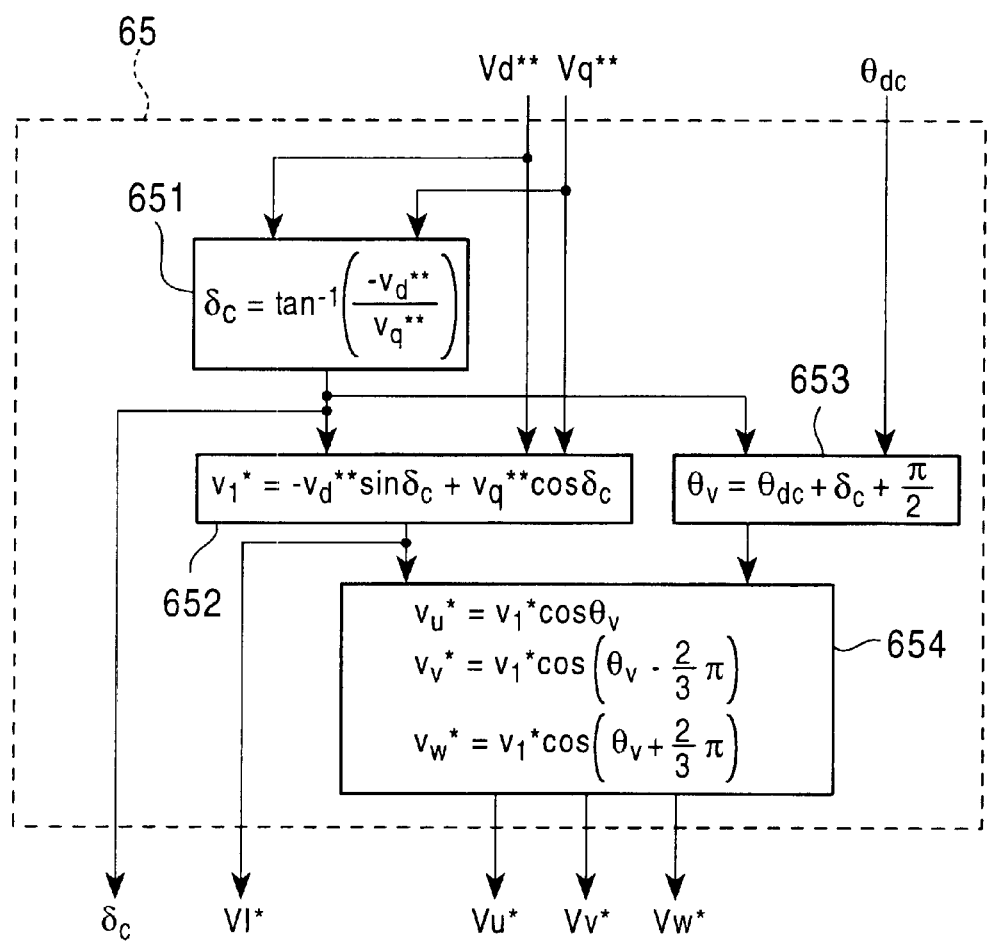
FIG. 11 is a diagram showing, in block form, the contents of computation in an inverse-converting unit.

The inverse-converting unit 65 shown in FIG. 11 receives the control axis voltage commands $V_d^{}$ and $V_q^{}$ to generate three-phase voltage commands. The dc-axis voltage command $V_d^{**}$ and qc-axis voltage command $V_q^*$ delivered out of the current controller 64 are inputted to an operating section 651. In the operating section 651, phase $\delta_c$ of the motor voltage $V_1$ as viewed from the qc-axis is computed pursuant to equation (9). The phase $\delta_c$, the dc-axis voltage command $V_d^{}$ and the qc-axis voltage command $V_q^{}$ are inputted to an operating section 652. In the operating section 652, the magnitude $V_1^*$ of the voltage command is computed. The phase $\delta_c$ and the phase $\theta_{dc}$ are inputted to an operating section 653, and phase $\theta_v$ is computed. The phase $\theta_v$ and the magnitude $V_1^*$ of the voltage command are inputted to an operating section 654, and three-phase voltage commands $V_u^*$, $V_v^*$ and $V_w^*$ are computed. It will be appreciated that the phase $\theta_{dc}$ indicates the phase of the virtual rotor flux axis (dc-axis) as viewed from the stator U-phase winding axis, and the phase $\theta_v$ computed in the operating section 653 indicates the phase of the output voltage vector.

Figure 12:
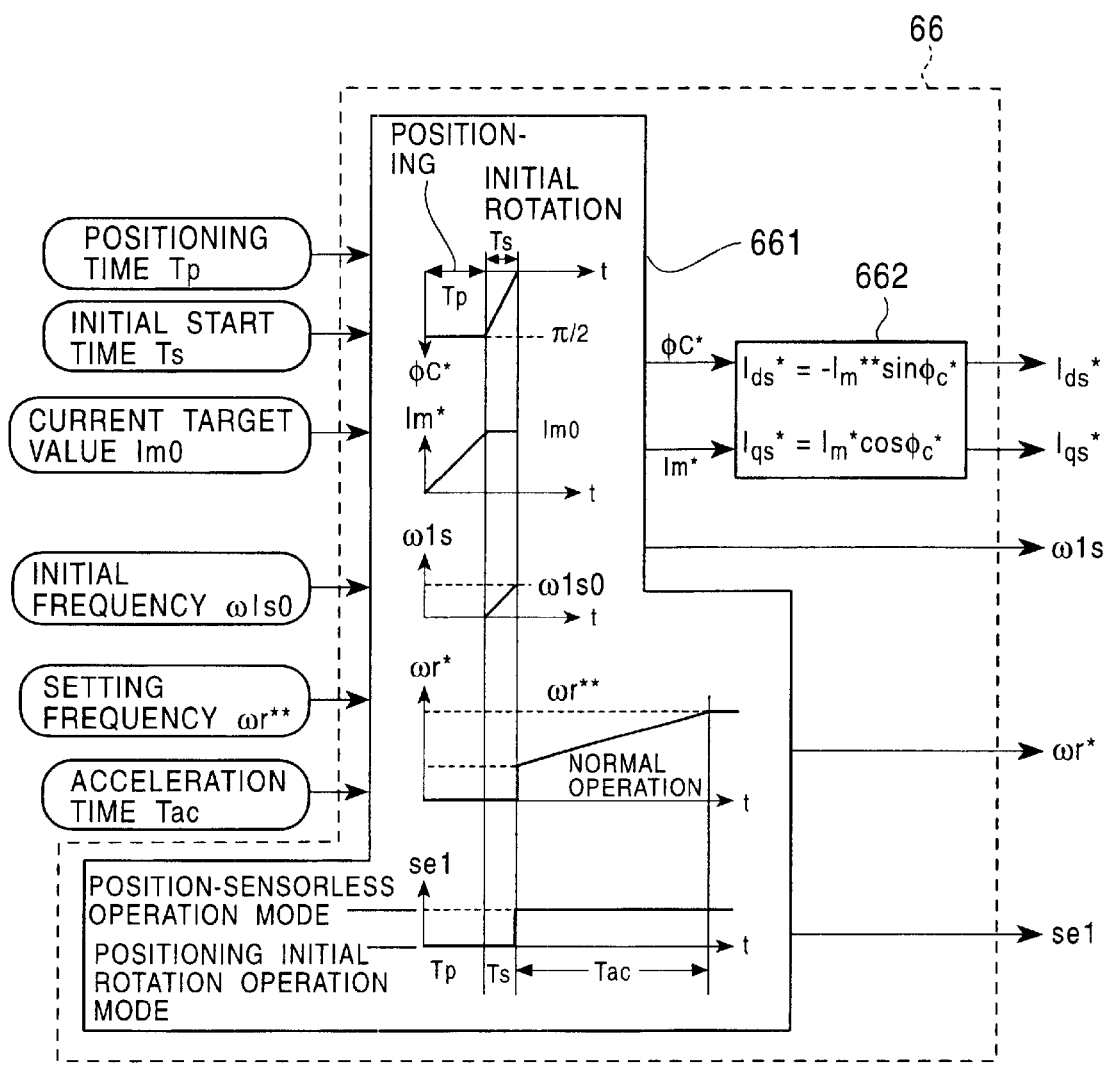
FIG. 12 is a diagram showing, in block form, the contents of computation in a start/operation manager.

Referring now to FIG. 12, the contents of the start/operation manager 66 will be described.

The positioning time $T_p$, current target value $I_{mo}$, initial rotation time $I_s$, initial frequency $\omega_{1so}$, accelerating time $T_{ac}$ and setting frequency $\omega_r^{**}$ delivered out of the interface 67 are inputted to a sequence operating section 661. In the sequence operating section 661, the setting values are inputted and the command values conforming to a lapse time are computed. Here, in relation to time t, the output values of the sequence operating section 661 are computed pursuant to equation (20).

$$\phi_c^* = \begin{cases} -\dfrac{\pi}{2} & \cdots\ t < T_p \\ \dfrac{\pi}{2} \times \dfrac{1}{T_s} \times (t - T_p - T_s) & \cdots\ T_p \le t \le T_p + T_s \end{cases} \quad \text{Equation (20)}$$

$$I_m^* = \begin{cases} I_{m0} \times \dfrac{t}{T_p} & \cdots\ t < T_p \\ I_{m0} & \cdots\ T_p \le t \le T_p + T_s \end{cases}$$

$$\omega_{1s} = \begin{cases} 0 & \cdots\ t < T_p \\ \dfrac{\omega_{1s0}}{T_s}(t - T_p) & \cdots\ T_p \le t \le T_p + T_s \end{cases}$$

$$\omega_r^* = \begin{cases} 0 & \cdots\ t < T_p + T_s \\ \omega_{1s0} + \dfrac{\omega_r^{**} - \omega_{1s0}}{T_{ac}}(t - T_p - T_c) & \cdots\ T_p + T_s \le t \end{cases}$$

The phase command $\phi_c^*$ and current command $I_m^*$ delivered out of the sequence operating section are inputted to an operating section 662 in which dc-axis current commands $I_{ds}^*$ and $I_{qs}^*$ during positioning and initial rotation are computed pursuant to equation (21).

$$\begin{cases} I_{ds}^* = -I_m \cdot \sin\phi_c^* \\ I_{qs}^* = I_m \cdot \cos\phi_c^* \end{cases} \quad \text{Equation (21)}$$

When operation is performed with the above construction, the permanent magnet motor can be started by sequentially changing control modes, three in total, including a positioning mode that proceeds from the motor operation start to the expiration of time $T_p$, an initial rotation mode that proceeds from the end of the positioning mode to the expiration of time $T_s$ and a position-sensorless operation mode that proceeds after the initial rotation mode has ended. It will be appreciated that the frequency/phase preparation and speed detection unit 62 and the current controller 64 perform the control operations conforming to the individual control modes. Accordingly, the selecting signal sel conforming to the control mode is delivered.

The voltage phase and the current commands change with the individual control modes as will be described below. Firstly, in the positioning mode, the frequency $\omega_{1s}$ is fixed to zero, so that the voltage phase is fixed to a precedently set, predetermined value, and remains unchanged. The current command $I_m^*$ gradually increases to a predetermined value $I_{mo}$ but the phase $\phi_c^*$ is fixed to $-\pi/2$, with the result that $I_{ds}^* = I_m^*$ and $I_{qs}^* = 0$ are delivered as the dq-axis current commands. Next, during the initial rotation mode, the frequency $\omega_{1s}$ gradually increases and consequently, the voltage phase changes in the rotation direction. Further, the current command $I_m^*$ is fixed to $I_{mo}$ but the phase $\phi_c^*$ changes from $-\pi/2$ to 0. Accordingly, in connection with the dq-axis current commands, $I_{ds}^*$ first decreases gradually from $I_{ds}^* = I_{mo}$ and $I_{qs}^*$ first increases gradually from $I_{qs}^* = 0$, so that eventually, the $I_{ds}^*$ changes to $I_{ds}^* = 0$ and the $I_{qs}^*$ changes to $I_{qs}^* = I_{mo}$.

In the positioning mode and the initial rotation mode, the speed control shown in FIG. 9 is not carried out. Accordingly, after the control mode has returned to change to the position-sensorless operation mode, the value of the motor speed command $\omega_r^*$ is delivered to the speed controller 63.

At least one of the values of positioning time $T_p$, current target value $I_{mo}$, initial rotation time $T_s$, initial frequency $\omega_{1s0}$ and setting frequency $\omega_r^{}$ can be changed in its setting value. This permits the motor to be started steadily even when the motor constants change or the load condition changes. In the embodiment shown in FIG. 1, the setting value can be changed by the operation through the operator 7**.

Figures 13, 14:
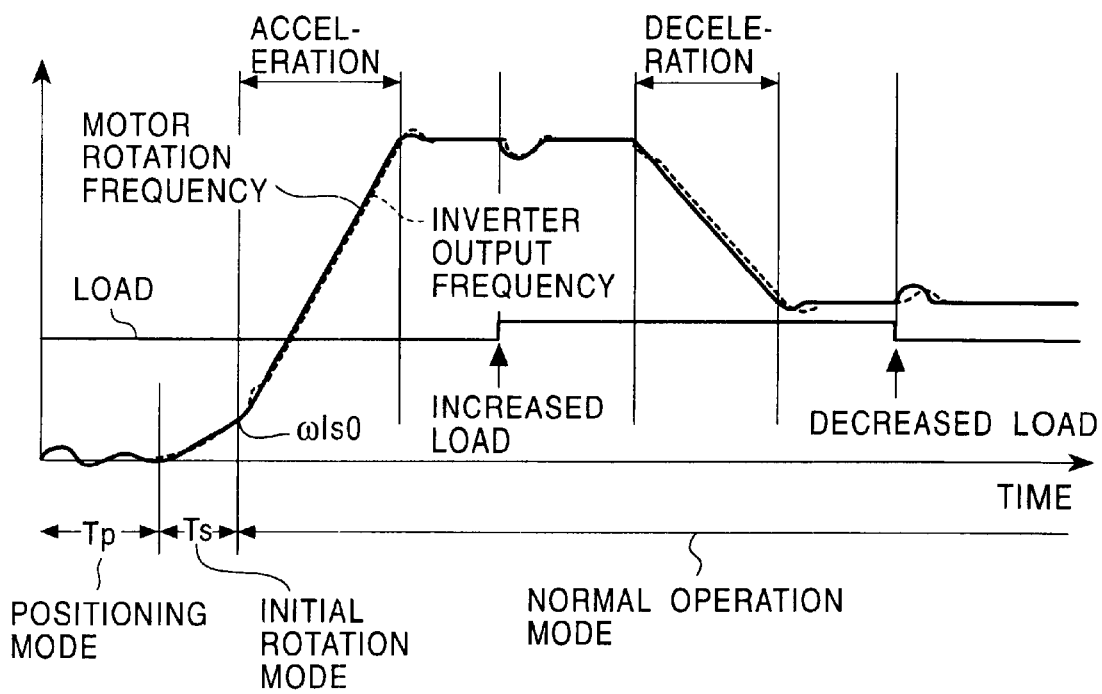
FIG. 13 is a graph showing the relation between the motor rotation frequency and the inverter output frequency corresponding to accelerating, decelerating and load changing operations when the synchronous motor is operated using the control method according to the invention.
FIG. 14 is a diagram showing a method of estimating a parameter error of inductance L.

Referring now to FIG. 13, there is illustrated the relation between the motor rotation frequency and the inverter output frequency when the synchronous motor is operated using the control method of the present embodiment. FIG. 13 shows the behavior of the motor driven starting with motor operation initiation and going through the three control modes (positioning mode, initial rotation mode and position-sensorless control mode (normal operation mode)). In the position-sensorless control mode, the frequency changes owing to four main causes, that is, acceleration, deceleration, increased load and decreased load as shown in the figure. The motor rotation frequency is indicated in terms of a motor electrical angle frequency. The relation between the motor rotation frequency and the inverter output frequency in the individual modes will now be described.

(1) In the positioning mode, the inverter output frequency is fixed to zero. On the other hand, the rotor changes its direction to a predetermined position through the positioning control and as a result, the motor rotation frequency vibrates between positive and negative values. Vibration of speed attenuates gradually.

(2) In the initial rotation mode, the motor rotation frequency and the inverter frequency rise.

(3) When an accelerating operation is carried out in the position-sensorless control mode, the inverter frequency is so controlled as to fall below the motor rotation frequency.

(4) When a decelerating operation is carried out in the position-sensorless control mode, the inverter frequency is so controlled as to exceed the motor rotation frequency.

(5) When the load on the motor is increased in the position-sensorless control mode, the inverter frequency is so controlled as to exceed the motor rotation frequency immediately after the load changes.

(6) When the load on the motor is decreased in the position-sensorless control mode, the inverter frequency is so controlled as to fall below the motor rotation frequency immediately after the load changes.

The difference between the inverter output frequency and the motor rotation frequency is determined in the aforementioned items (3) to (6) because in the frequency/phase preparation and speed detection unit 62, the inverter output frequency is caused to follow the motor rotation frequency so as to make the phase error $\Delta\theta$ coincident with the phase error command $\Delta\theta$.

In the phase error operating unit 61 shown in FIG. 5, the phase $\phi_m$ is determined using the command value $V_1^*$ for the motor voltage, the motor winding resistance setting value $r_c$, the motor winding inductance setting value $L_c$ and the motor speed command $\omega_r^*$. If, of them, the motor winding resistance setting value $r_c$ and motor winding inductance setting value $L_c$ representing the motor constants, and the voltage command value $V_1^*$ deviate from the actual values, the phase $\phi_m$ determined through the computation differs from the actual value, thereby bringing about a steady error in the phase error $\Delta\theta$. As an example, two methods for reduction of the error will be described below, of which one uses d-axis compensation voltage $VI_d$ and q-axis compensation voltage $VI_q$, and the other adjusts the phase so as to minimize the motor current.

In describing the method using the compensation voltages $VI_d$ and $VI_q$, an instance where the voltage and the inductance differ from the actual values will be shown for simplicity of explanation.

The voltage equation given by equation (1) is for the case where phase error $\Delta\theta=0$ stands but in the event of occurrence of the phase error, the voltage equation is reduced to equation (22), where the current change term is neglected.

$$v_{dc} = r \cdot i_{dc} - \omega_r \cdot L \cdot i_{qc} + k_E \cdot \omega_r \cdot \sin \Delta\theta$$

$$v_{qc} = \omega_r \cdot L \cdot i_{dc} + r \cdot i_{qc} + k_E \cdot \omega_r \cdot \cos \Delta\theta \qquad \text{Equation (22)}$$

Here, given that $$v_d^{} = v_{dc} + dv_d, \; v_q^{} = v_{qc} + dv_q, \; v_1^* = v_1 + dv$$

$$I_d^* = i_{dc}, \; I_q^* = i_{qc} \qquad \text{Equation (23)}$$

$$L_c = L + dL, \; r_c = r, \; k_{EC} = k_E$$

, there results equation (24).

$$v_{dc}^{**} = (r_c I_d^* - \omega_r L_c I_q^*) - dr_c I_{dc}^* + \omega_r dL I_q^* + k_{Ec} \omega_r \sin \Delta\theta + dv_d$$

$$v_{qc}^{**} = (\omega_r L_c I_d^* + r_c I_q^* + k_{EC} \omega_r) - \omega_r dL I_{dc}^* - k_{E\omega_r} + k_{Ec} \omega_r \cos \Delta\theta + dv_q \qquad \text{Equation (24)}$$

Since the first term in equation (24) corresponds to the motor voltage model 647, other terms correspond to the d-axis compensation voltage $VI_d$ and the q-axis compensation voltage $VI_q$. Therefore, the following equation results.

$$VI_d = \omega_r dL I_q^* + k_{Ec} \omega_r \sin \Delta\theta + dv_d$$

$$VI_q = -\omega_r dL I_d^* - k_E^* \omega_r + k_{EC} \omega_r \cos \Delta\theta + dv_q \qquad \text{Equation (25)}$$

On the assumption that a ratio between the primary voltage command and its error, a ratio between the d-axis command and its error and a ratio between the q-axis command and its error are identical to each other, the relation of equation (26) is obtained and besides, by using the relation of equation (27), $\Delta\theta$ is erased from equation (25) to obtain equation (28).

$$\frac{dv}{v_1^*} = \frac{dv_d}{v_d^*} = \frac{dv_q}{v_q^*} \qquad \text{Equation (26)}$$

$$\sin^2\theta + \cos^2\theta = 1 \qquad \text{Equation (27)}$$

$$(k_{Ec}\omega_r)^2 = \left(-VI_d + I_q^* \omega_r dL + v_d^{**} \frac{dv}{v_1^*}\right)^2 + \left(VI_q + I_d^* \omega_r dL - v_q^{**} \frac{dv}{v_1^*} + k_{Ec} \omega_r\right)^2 \qquad \text{Equation (28)}$$

Equation (28) contains an inductance error and a voltage error. In the presence of only one of these errors, this error can be estimated using equation (28).

Referring now to FIG. 14, the parameter estimating unit 68L will be described. The compensation voltage $VI_d$ for the d-axis current control, the compensation voltage $VI_q$ for the q-axis current control and the dq-axis current commands $I_d^*$ and $I_q^*$, computed in the current controller 64 and delivered therefrom, and the speed command $\omega_r^*$ are inputted to the parameter estimating unit 68L. In the parameter estimating unit 68L, the frequency command/inductance product $(\omega_r^*) \times L_c$ used in the operating section 613 in FIG. 5 and the actual shift amount $\omega_r^* \times dL$ are computed.

By substituting $dv=0$ to equation (28), $\omega_r^* \times dL$ can be expressed by equation (29). This value is subtracted from $(\omega_r^*) \times L_c$ in equation (17) for the phase error operating unit shown in FIG. 5 and as a result, a correct inductance is reflected upon the equation. But in equation (29), two different values can be determined by either addition of the result of square root operation or subtraction of the result of square root operation, and one of the two different values is selected in accordance with the magnitude of the error.

$$\omega_r^* \cdot dL = \frac{I_q^* VI_d - I_d^*(VI_q + k_{Ec}\omega_r^*) \pm \sqrt{\{I_d^* \cdot VI_d - I_q^*(VI_q + k_{Ec}\omega_r^*)\}^2 + ((I_q^*)^2 + (I_d^*)^2) \cdot (k_{Ec}\omega_r^*)^2}}{(I_q^*)^2 + (I_d^*)^2} \qquad \text{Equation (29)}$$

Figures 15, 16:
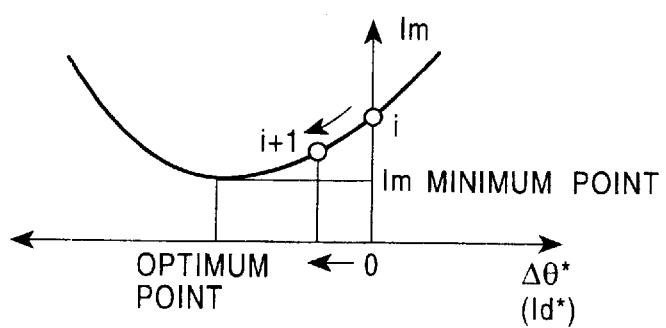
FIG. 15 is a diagram showing a method of estimating a parameter error of output voltage $V_1^*$.
FIG. 16 is a graphic representation for explaining the principle of bringing the current phase to an optimum condition by means of a phase adjuster.

Referring now to FIG. 15, the parameter estimating unit 68V will be described. The compensation voltage $VI_d$ for the d-axis current control, the compensation voltage $VI_q$ for the q-axis current control and the dq-axis voltage commands $V_d^{}$ and $V_q^{}$, computed in the current controller 64 and delivered therefrom, as well as the magnitude $V_1^*$ of the motor voltage and the command speed $\omega_r^*$ are inputted to the parameter estimating unit 68V. In the parameter estimating unit 68V, the shift amount $dV$ between the magnitude $V_1^*$ of the motor voltage used in the operating section 613 in FIG. 5 and the actual value is computed.

$$dv = \frac{V_d^{} VI_d - V_q^{}(VI_q + k_{Ec}\omega_r^*) \mp \sqrt{-\{V_d^{**}(VI_q + k_{Ec}\omega_r^*) - V_q^{**} VI_d\}^2 + (V_1^*)^2 \cdot (k_{Ec}\omega_r^*)^2}}{V_1^*} \qquad \text{Equation (30)}$$

By substituting $dL=0$ to equation (28), $dV$ can be obtained pursuant to equation (30). Then, this value is subtracted from $V_1^*$ in equation (17) for the phase error operating unit shown in FIG. 5 so as to reflect a correct voltage upon the equation. But in equation (30), two different values can be obtained by either addition of the results of square root operation or subtraction of the results of square root operation. One of these values is selected in accordance with the magnitude of the error.

The methods for parameter error using the d-axis compensation voltage $VI_d$ and the q-axis compensation voltage $VI_q$ shown in FIGS. 14 and 15 are effective when an error in only one of a plurality of parameters occurs. Contrary to this, in a method effective for a plurality of parameter errors, two phase adjusters such as phase adjusters 69I and 69S exemplified in the overall construction diagram of FIG. 1 are used. The phase adjusters 69I and 69S will now be described by making reference to FIG. 16.

As described above, the operation result of the phase error $\Delta\theta$ contains the error due to parameter error. Because of this error, the phase of the dc-qc axis rotary coordinates cannot coincide with the d-q rotary coordinates, and the steady axis shift $\Delta\theta$ remains. The current controller 64 controls the current to cause it to flow in only the q-axis direction by making the dc-axis current command $I_d^*$ zero, but when the real axis shifts from the control axis, current flows also in the d-axis direction shown by the solid lines to decrease the torque current component in the q-axis direction correspondingly. As the axis shift $\Delta\theta_e$ increases, the torque current component decreases.

In consequence, the speed is decreased to cause the speed controller 63 to increase the torque current command $I_q^*$ and eventually, the magnitude $I_m$ of the motor current increases owing to the axis shift. Conversely speaking, when the real axis is in phase with the control axis and the current flows at the phase at which the maximum torque is generated, the magnitude $I_m$ of the motor current is minimized. Thus, the motor current phase is adjusted so that the current may flow at the phase at which the magnitude $I_m$ of the current is minimized.

Two method for changing the current phase will be described.

In the first method, a predetermined value is set to the exciting current command value $I_d^*$. By substituting the value to the $I_d^*$ which is normally set to zero, the phase of the motor current can be changed arbitrarily. In the second method, a predetermined value is set to the phase error command $\Delta\theta^*$. By substituting the value to the $\Delta\theta^*$ which is normally set to zero, the axis shift between the real axis and the control axis can be the sum of the axis shift $\Delta\theta_e$ due to the parameter error mentioned above and the phase error command $\Delta\theta^*$. Then, by adjusting the error command $\Delta\theta^*$ to make $(\Delta\theta^*)+\Delta\theta_e$ zero, the real axis can coincide with the control axis. The first method can be implemented by the phase adjuster 69I, and the second method can implemented by the phase controller 69S.

Referring to FIG. 16, an example of a method for minimizing the motor current $I_m$ by adjusting the exciting current command $I_d^*$ or the phase error command $\Delta\theta^*$ will be described. It is assumed that during an i-th control period, a value is set to the exciting current command $I_d^*$ or the phase error command $\Delta\theta^*$ to cause the motor current to have the magnitude of $I_m(i)$. Then, it is assumed that during (i+1)-th control period, a randomly selected value is subsequently set to $I_d^*$ or $\Delta\theta^*$ to cause the motor current magnitude to change to $I_m(i+1)$. If $I_m(i+1)$ is smaller than $I_m(i)$, then the setting value used during (i+1)-th control period will be selected as the value of $I_d^*$ or $\Delta\theta^*$. By repeating the above operation, the setting value for minimizing the motor current $I_m$ can be searched. Putting the above method aside, the optimum solution searching algorithm such as the known Newton-Raphson method can be used to determine the setting value.

According to the present invention, the phase angle is expressed by the value not depending on the position of the control axis to determine the phase error, so that the position-sensorless control system of the synchronous motor which can be stable even when the large phase error occurs during, for example, the abrupt load change or the abrupt accelerating/decelerating operation can be provided.

What is claimed is:

1. A position-sensorless controlling method of synchronous motor comprising the steps of:

determining a first phase difference between a motor current of a synchronous motor having a field system of a permanent magnet and an actual rotation phase;

determining a second phase difference between said motor current and a virtual rotation phase; and estimating a phase error between an actual rotation position and a virtual rotation position from a difference between said first phase difference and said second phase difference.

2. A position-sensorless controlling method of synchronous motor according to claim 1, wherein said second phase difference is determined using a motor voltage, said motor current and motor constants.

3. A position-sensorless controlling method of synchronous motor according to claim 1 further comprising the step of modifying a frequency of an AC voltage applied to said synchronous motor to cause said phase error to approach zero.

4. A position-sensorless controlling method of synchronous motor according to claim 1, wherein motor voltage or motor constants are estimated by using a q axis compensation voltage for q-axis current control adapted to make a torque current component of the motor current in phase with an induced voltage coincident with a torque current command, and a d-axis compensation voltage for d-axis current control adapted to make an exciting current component of the motor current orthogonal to the induced voltage coincident with an exciting current command; and said first phase difference is determined using estimation values.

5. A position-sensorless controlling method of synchronous motor for estimating a rotor position of a synchronous motor having a field system of a permanent magnet and being driven by an inverter circuit, comprising the steps of:

determining a first phase difference between a motor current and an actual rotation phase by using magnitude of motor current, magnitude of motor voltage, a phase difference between said motor current and said motor voltage, and motor constants;

determining a second phase difference between said motor current and a virtual rotation phase; and modifying an estimation position such that said first phase difference equals to said second phase difference.

6. A position-sensorless controlling method of synchronous motor according to claim 5, wherein said first phase difference is calculated by decomposing an induced voltage into a current in-phase induced voltage component in phase with the motor current and a current orthogonal induced voltage component with a phase which differs 90° from a phase of the motor current;

determining said current in-phase induced voltage component and said current orthogonal induced voltage component using the magnitude of the motor current, the magnitude of the motor voltage, the phase difference between the motor current and the motor voltage, and at least one of a motor winding resistance and a motor winding inductance; and using at least two values of the three of said current in-phase induced voltage component, said current orthogonal induced voltage component, and the magnitude of the induced voltage.

7. A position-sensorless controlling method of synchronous motor according to claim 5, wherein the estimation position is modified by modifying an inverter output frequency such that said first phase difference equals to said second phase difference.

8. A position-sensorless controlling method of synchronous motor according to claim 7, wherein said inverter output frequency is a sum of first and second frequencies, said first frequency is a frequency concerning a rotation speed determined by using one of magnitude of motor current, magnitude of motor voltage, phase difference between the motor current and the motor voltage, motor induced voltage constant, and at least one of motor winding resistance and motor winding inductance; and said second frequency is a frequency determined such that said first phase difference equals to said second phase difference.

9. A position-sensorless controlling method of synchronous motor according to claim 8, said first frequency is used as a detection speed which in turn is compared with a command speed to control the motor voltage.

10. A position-sensorless controlling method of synchronous motor according to claim 7, wherein said inverter output frequency is attenuated in its high-frequency components and thereafter used as a detection speed which in turn is compared with a command speed to control the motor voltage.

11. A position-sensorless controlling method of synchronous motor for estimating a rotor position of a synchronous motor having a field system of a permanent magnet and being driven by an inverter circuit, wherein;

three control modes of positioning mode, initial rotation mode and position-sensorless operation mode occurring in sequence from operation initiation are provided;

in said positioning mode, a voltage phase is arbitrarily fixed to gradually raise a current applied to a motor winding to a predetermined current value;

in said initial rotation mode, the voltage phase is rotated in a rotation direction to raise to a predetermined inverter output frequency; and in said position-sensorless operation mode, a difference between motor current and an actual rotation phase is determined as a first phase difference from three values of magnitude of the motor current, magnitude of motor voltage and a phase difference between the motor current and the motor voltage through computation, a difference between the motor current and a virtual rotation phase is determined as a second phase difference through computation, and an estimation position is modified such that said first phase difference coincides with said second phase difference.

12. A position-sensorless controlling method of synchronous motor according to claim 11, wherein time for said positioning mode and said pre-determined current value is changeable, and time for said initial rotation mode and said pre-determined inverter output frequency is changeable.

13. A position-sensorless controlling method of synchronous motor for estimating a rotor position of a synchronous motor having a field system of a permanent magnet and being driven by an inverter circuit, comprising the step of:

making inverter output frequency follow a motor electrical angle frequency to estimate a motor position, by decreasing the inverter output frequency below the motor electrical angle frequency during acceleration of the synchronous motor, increasing the inverter output frequency above the motor electrical angle frequency during deceleration of the synchronous motor, and increasing the inverter output frequency above the motor electrical angle frequency during increasing load on the synchronous motor, and decreasing the inverter output frequency below the motor electrical angle frequency during decreasing the load on the synchronous motor.

* * * * *